(12) United States Patent
McBrearty et al.

(10) Patent No.: US 6,721,901 B1
(45) Date of Patent: Apr. 13, 2004

(54) METHOD AND SYSTEM FOR RECOVERING MIRRORED LOGICAL DATA VOLUMES WITHIN A DATA PROCESSING SYSTEM

(75) Inventors: Gerald Francis McBrearty, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/514,389

(22) Filed: Feb. 28, 2000

(51) Int. Cl.$^7$ .................................................. G06F 11/16
(52) U.S. Cl. .................. 714/6; 714/5; 714/54; 707/202; 707/204
(58) Field of Search .................. 714/5, 6, 54; 711/114, 711/161, 162; 707/202, 204

(56) References Cited

U.S. PATENT DOCUMENTS 6,205,449 B1 * 3/2001 Rastogi et al. .............. 707/202
6,397,308 B1 * 5/2002 Ofek et al. .................. 711/162

* cited by examiner

*Primary Examiner*—Nadeem Iqbal
*Assistant Examiner*—Christopher Euripidou
(74) *Attorney, Agent, or Firm*—Volel Emile; Bracewell & Patterson, L.L.P.

(57) ABSTRACT

A method and system for recovering mirrored logical data volumes within a computer system after a system failure is disclosed. A computer system includes mirrored logical volumes that can be accessed by multiple nodes. Mirrored in-flight logs are provided for the mirrored logical volumes. The mirrored in-flight logs include multiple node partitions, each node partition corresponding to one of the nodes. Furthermore, each entry within the mirrored in-flight logs indicate whether or not a write operation is currently being performed by at least one of the nodes. After an abnormal termination of one of the nodes due to, for example, a system failure, one of the remaining nodes is automatically selected to copy data from one of the mirrored logical volumes to another of the mirrored logical volumes, according to the entries within one of the mirrored in-flight logs.

12 Claims, 4 Drawing Sheets

METHOD AND SYSTEM FOR RECOVERING MIRRORED LOGICAL DATA VOLUMES WITHIN A DATA PROCESSING SYSTEM

BACKGROUND OF THE INVENTION

1. Technical Field

The present invention relates to a method and system for data processing in general, and in particular to a method and system for recovering mirrored logical data volumes within a data processing system. Still more particularly, the present invention relates to a method and system for recovering mirrored logical data volumes within a computer system after a system failure.

2. Description of the Prior Art

Generally speaking, a storage system within a computer is typically made up of one or more logical volume groups, which are, in turn, made up of multiple logical volumes that are physically represented by physical volumes. The logical volume groups, the logical volumes, and the physical volumes are organized in a hierarchical fashion managed by a logical volume manager. Each physical volume is divided into physical partitions, each of which is equivalent to a segment size (i.e., the actual units of space allocation) on a hard disk. Although data on a logical volume appear to be contiguous to a user, these data can be non-contiguously stored on one or more physical volumes. This allows the logical volumes to be resized and relocated, and their contents to be replicated in a rapid fashion.

In a mirrored computer system, each logical volume has a mirror (or redundant) logical volume. Details of a mirrored computer system can be found in *AIX 6000 System Guide*, McGraw-Hill, New York, 1996, the pertinent of which is incorporated by reference herein. After a system failure, such as a hang-up or crash, the mirrored logical volumes must be resynchronized. The resynchronization should be performed before the storage system is accessed; otherwise, users may access inconsistent data as a result of write requests that were in-flight. In other words, write operations to specific partitions in a logical volume may not have been completed in both mirrored partitions at the time of the system failure; and as a result, data stored in the mirrored partitions may be inconsistent. The present disclosure provides a method for recovering mirrored logical volumes within a computer system after a system failure.

SUMMARY OF THE INVENTION

In accordance with a preferred embodiment of the present invention, a computer system includes mirrored logical volumes that can be accessed by multiple nodes. Mirrored in-flight logs are provided for the mirrored logical volumes. The mirrored in-flight logs include multiple node partitions, each node partition corresponding to one of the nodes. Furthermore, each entry within the mirrored in-flight logs indicates whether or not a write operation is currently being performed by at least one of the nodes. After an abnormal termination of one of the nodes due to, for example, a system failure, one of the remaining nodes is automatically selected to copy data from one of the mirrored logical volumes to another of the mirrored logical volumes, according to the entries within one of the mirrored in-flight logs.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention may be executed in a variety of computers under a number of different operating systems. The computer may be, for example, a personal computer, a mid-range computer or a mainframe computer. In addition, the computer may be a stand-alone system or part of a network such as a local-area network (LAN) or a wide-area network (WAN). For the purpose of illustration, a preferred embodiment of the present invention, as described below, is implemented on an RS/6000™ computer, manufactured by International Business Machines Corporation of Armonk, N.Y.

Figure 1:
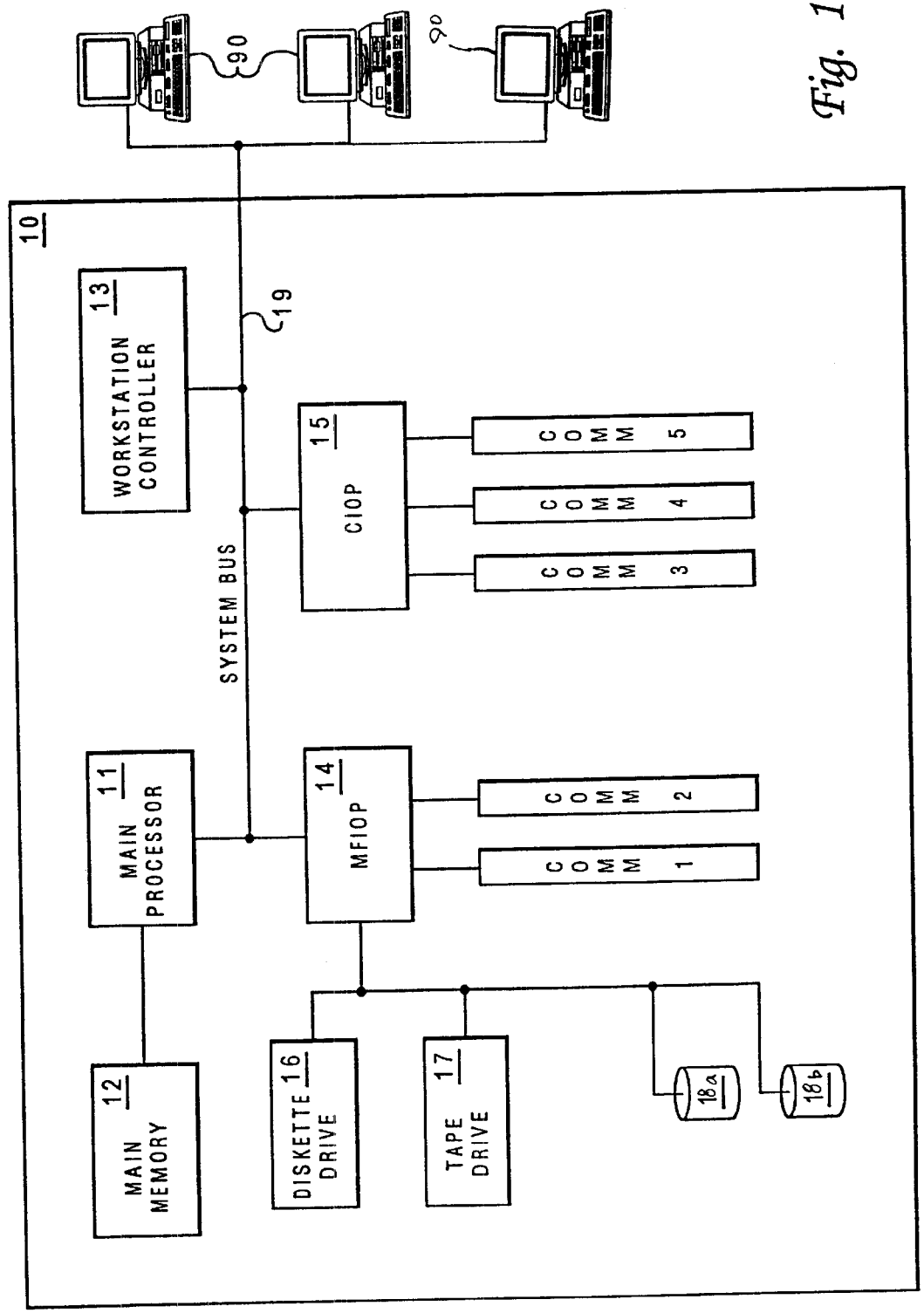
FIG. 1 is a block diagram of a computer system in which a preferred embodiment of the invention can be executed.

Referring now to the drawings and in particular to FIG. 1, there is illustrated a block diagram of a computer system in which a preferred embodiment of the invention can be executed. Within a computer box 10, a main processor 11 is coupled to a main memory 12 and a multiple-function I/O processor (MFIOP) 14. Main processor 11 may include a single processor or multiple processors. Several peripheral storage devices such as a diskette drive 16, a tape drive 17, and a pair of direct access storage devices (DASDs) 18a, 18b are controlled by MFIOP 14. In addition, MFIOP 14 provides communications to other devices via communication ports such as COMM 1 and COMM 2.

Attached to a system bus 19 are a workstation controller 13 and a communications I/O processor (CIOP) 15. Workstation controller 13 provides communications between main processor 11 and workstations 90 that may be connected to the computer system. CIOP 15 provides communications to other devices via communication ports such as COMM3, COMM4, and COMM5.

Figure 2:
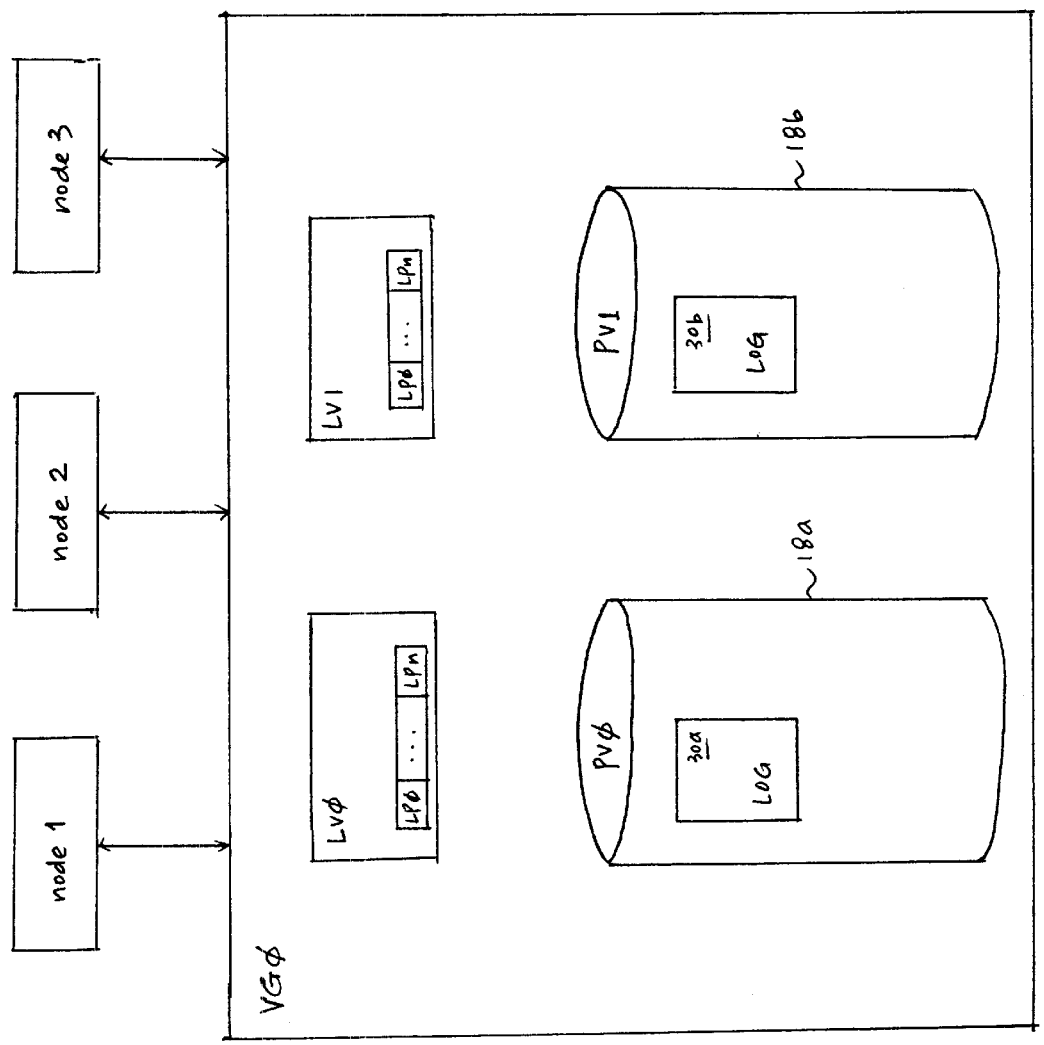
FIG. 2 is a block diagram of a mirrored logical storage system within the computer system from FIG. 1, in accordance with a preferred embodiment of the present invention.

With reference now to FIG. 2, there is illustrated a block diagram of a mirrored logical storage system within computer system 10, in accordance with a preferred embodiment of the present invention. As shown, a hierarchy of structures is used to manage multiple disk drives. Each disk drive is known as a physical volume (PV), such as PV0 for disk drive 18a and PV1 for disk drive 18b. Configuration and identification information such as a physical volume identifier that is unique to computer system 10 can be found in each PV. Every PV in use belongs to a volume group (VG).

A VG, such as VG0, is a collection of several PVs, such as PV0 and PV1, of varying sizes and types. A PV may belong to only one VG per system. When installing a system, one root VG is automatically created. The root VG includes paging space, a journal log, boot data, and a dump storage. When a PV is assigned to a VG, the physical blocks of storage media on the PV are organized into physical partitions of a specific size. In other words, when a PV is added to a VG, the PV is partitioned into contiguous, equal-sized units of space called physical partitions (PPs). A PP is the smallest unit of storage space allocation and is a contiguous space on a PV. For space-allocation purposes, each PV is preferably divided into five regions, namely, outer_edge, inner_edge, outer_middle, inner_middle, and center. The number of PPs in each region varies, depending on the total capacity of the disk drive.

Within each VG, one or more logical volumes (LVs) are defined. In FIG. 2, for example, LV0 and LV1 are defined within VG0. LVs are groups of information located on PVs. Although data on a LV appear to be contiguous to a user, these data can be non-contiguously stored on one or more PVs. LVs can also be copied, listed, removed, and have the number of maintained copies increased or decreased. LVs can also be relocated when the associated VG is reorganized.

Each LV includes multiple logical partitions (LPs), such as LP0 through LPn. Each LP within an LV corresponds to one PP within a PV. If mirroring is specified for an LV, additional PPs are allocated in a different PV to store the additional copies of each LP. Although the LPs are numbered consecutively, the underlying PPs in a PV are not necessarily consecutive or contiguous, as mentioned previously. The number of LPs within an LV can be specified during the creation of the LV. An LP may have one, two, or three physical partitions, depending on the number of instances of the data that need to be maintained. Specifying one instance means there is only one copy of the LV (the default), and thus, there is a direct mapping of one LP to one PP.

LVs can serve a number of system purposes, such as paging, but each LV that holds ordinary system or user data or programs contains a single file system, such as a journalled file system (JFS). Each JFS includes a pool of page-size (e.g., four kilobytes) blocks. When data are to be written into a file, one or more additional blocks are allocated to that file. These blocks may or may not be contiguous with one another or with other blocks previously allocated to the file.

The LV defines allocation of disk space down to the physical-partition level. Finer levels of data management are accomplished by higher level software components such as a Virtual Memory Manager or a file system. Typically, one file system can be created for each LV.

The system shown in FIG. 2 is a multi-initiator system in which concurrent files are represented. LV0 and LV1 can be concurrently accessed by node 1, node 2, and node 3, each node (such as workstation 90 in FIG. 1) represents one of the initiators. In addition, mirrored PPs are provided within PV1 and PV2 for LPs of LV0. Similarly, mirrored PPs are provided within PV1 and PV2 for LPs of LV1. Thus, the data in PV1 are duplicates of the data in PV0; however, the mirrored corresponding LV data need not be stored in contiguous or even corresponding positions on the associated PVs within the VG. The data may be stored at randomly assigned positions in the disk drives that make up these PVs.

As a preferred embodiment of the present invention, each PV includes an in-flight log. For example, PV0 includes an in-flight log 30a, and PV1 includes an in-flight log 30b. The purpose of in-flight logs 30a and 30b is to track write requests from node 1, node 2, or node 3 when the write requests are being performed on a specific LP of LV0 and LV1, respectively (data are actually written on a corresponding PP of PV0 and PV1).

Figure 3:
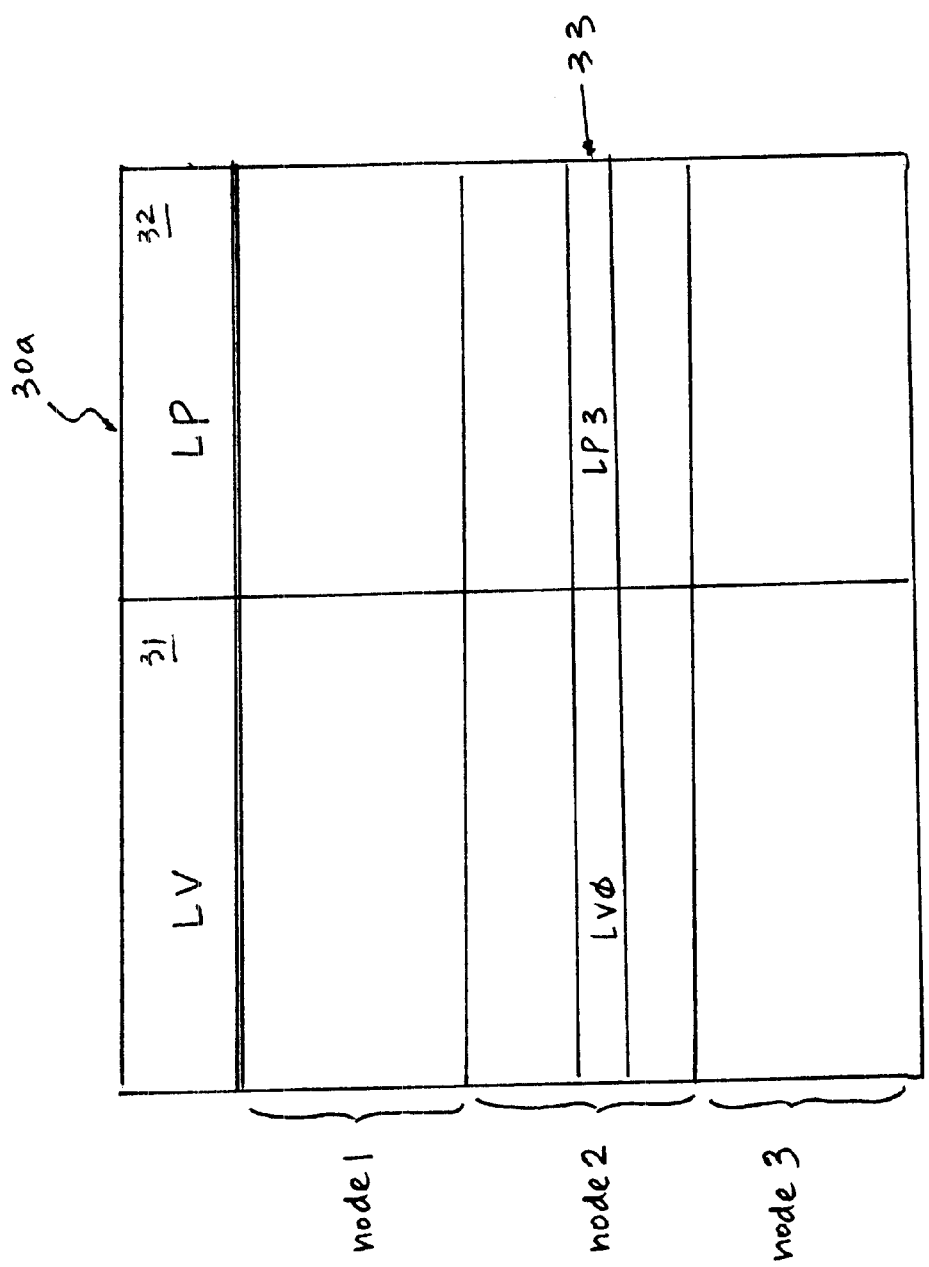
FIG. 3 is a logical depiction of an in-flight log according with a preferred embodiment of the present invention.

Referring now to FIG. 3, there is illustrated a detailed logical depiction of in-flight log 30a according to a preferred embodiment of the present invention. Because in-flight logs 30a and 30b are identical, only in-flight log 30a is illustrated. As shown, in-flight log 30a includes an LV column 31 and an LP column 32. Furthermore, in-flight log 30a is divided into three node partitions, and each node partition corresponds to one of the three nodes depicted in FIG. 2. Because of the node partitions, all nodes 1, 2, and 3 can access in-flight log 30a concurrently. The number of partitions within in-flight log 30a should correspond to the number of active nodes within the computer system. Before a node, for example, node 2, can perform a write request to an LP, for example, LP3 of LV0, an entry is initially made in in-flight log 30a, as well as in-flight log 30b, to indicate such, as shown in entry 33. If the write request is performed successfully (i.e., data written in a corresponding PP of PV0 and PV1), entry 33 will be removed from in-flight log 30a and in-flight log 30b after the write request has been successfully completed. Otherwise, if the write request is prevented from a normal completion, for example, by a system failure, entry 33 will remain in inflight log 30a, and a similar entry will remain in in-flight log 30b.

Figure 4:
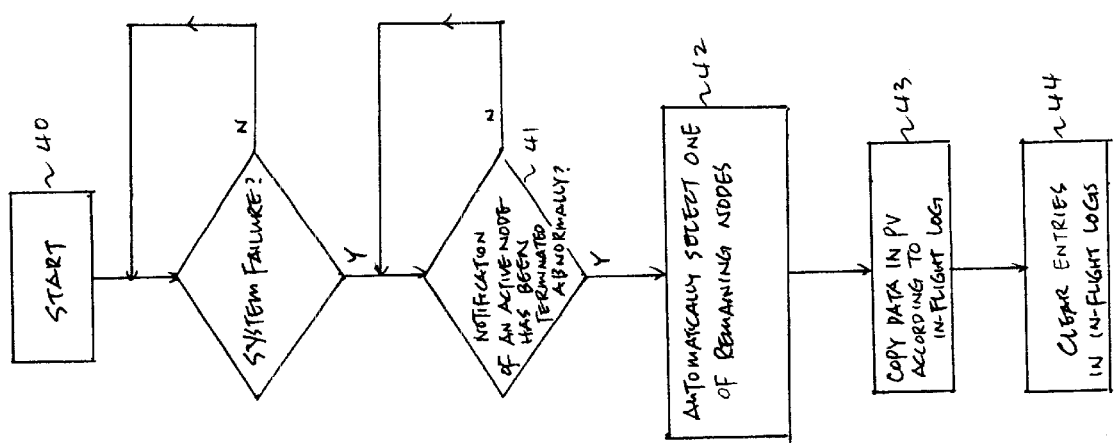
FIG. 4 is a high-level flow diagram of a method for recovering mirrored logical volumes within a computer system after a system failure, in accordance with a preferred embodiment of the present invention.

With reference now to FIG. 4, there is illustrated a high-level flow diagram of a method for recovering mirrored logical data volumes within a computer system after a system failure, in accordance with a preferred embodiment of the present invention. Starting at block 40, the process waits for a notification that an active node has been terminated abnormally due to a system failure, as shown in block 41. One of the remaining nodes is then automatically selected to read the portion of the in-flight log that corresponds to the abnormally terminated node, as depicted in block 42. The node selection can be performed via an arbitration process, a first-access-first-selected scheme, a random process, etc. The arbitration process can be based on, for example, selecting a node that has the least number of outstanding input/output requests to a VG according to a logical volume manager. In the system as shown in FIG. 2, for example, if node 1 is abnormally terminated, then either node 2 or node 3 will be automatically selected, via an arbitration, to read the node 1 partition of in-flight log 30a (or the node 1 partition of in-flight log 30b).

If node 2 is selected, then node 2 will be responsible for copying data from PV0 to PV1, according to each entry still remains within the node 1 partition of in-flight log 30a (or from PV1 to PV0, according to each entry within the node 1 partition of in-flight log 30b), as shown in block 43. All entries within the node 1 partition of inflight log 30a are then cleared, as depicted in block 44. The node 1 partition of in-flight log 30a can then be copied over the node 1 partition of in-flight log 30b, (or the node 1 partition of in-flight log 30b is copied over the node 1 partition of in-flight log 30a). As a result, the data within PV0 and PV1 are resynchronized, and are ready to be accessed again.

As has been described, the present invention provides a method and system for recovering mirrored LVs within a computer system after a system failure. Although only one multiple-partitioned in-flight log per PV is illustrated in the present invention, multiple in-flight logs with each log corresponds to each node can also be implemented. For example, in the computer system as shown in FIG. 2, a first set of mirrored in-flight logs corresponds to node 1, a second set of mirrored in-flight logs corresponds to node 2, and a third set of mirrored in-flight logs corresponds to node 3. Also, the present invention can be applicable to physical segments if they are available.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for recovering mirrored logical volumes within a computer system after a system failure, wherein said computer system includes a plurality of active nodes, said method comprising:

providing a pair of mirrored in-flight logs for each of said plurality of active nodes;

providing mirrored in-flight logs for said mirrored logical volumes, wherein said mirrored in-flight logs include a plurality of node partitions and each node partition corresponds to one of said plurality of active nodes, wherein said mirrored in-flight logs indicate whether or not a write operation is currently being performed by at least one of said plurality of active nodes; and after an abnormal termination of one of said plurality of active nodes, automatically selecting a remaining node among said plurality of nodes to copy data from one of said mirrored logical volumes to another of said mirrored logical volumes.

2. The method according to claim 1, wherein said data copying from one of said mirrored logical volumes to another of said mirrored logical volumes is performed according to entries within a node partition of one of said mirrored in-flight logs corresponded to said abnormally terminated node.

3. The method according to claim 2, wherein said method further includes a step of clearing all entries within said node partition of one of said mirrored in-flight logs corresponded to said abnormally terminated node.

4. The method according to claim 1, wherein said selecting step is based on an arbitration process.

5. A computer system capable of recovering mirrored logical volumes after a system failure, wherein said computer system includes a plurality of active nodes, said computer system comprising:

a pair of mirrored in-flight logs for each of said plurality of active nodes;

mirrored in-flight logs for said mirrored logical volumes, wherein said mirrored in-flight logs include a plurality of node partitions and each node partition corresponds to one of said plurality of active nodes, wherein said mirrored in-flight logs indicate whether or not a write operation is currently being performed by at least one of said plurality of active nodes; and means for automatically selecting a remaining node among said plurality of nodes to copy data from one of said mirrored logical volumes to another of said mirrored logical volumes, after an abnormal termination of one of said plurality of active nodes.

6. The computer system according to claim 5, wherein said data copying from one of said mirrored logical volumes to another of said mirrored logical volumes is performed according to entries within a node partition of one of said mirrored in-flight logs corresponded to said abnormally terminated node.

7. The computer system according to claim 6, wherein said computer system further includes a means for clearing all entries within said node partition of one of said mirrored in-flight logs corresponded to said abnormally terminated node.

8. The computer system according to claim 5, wherein said means for selecting utilizes an arbitration process.

9. A computer program product residing on a computer usable medium for recovering mirrored logical volumes after a system failure, wherein said computer system includes a plurality of active nodes, said computer program product comprising:

program code means for providing a pair of mirrored in-flight logs for each of said plurality of active nodes:

program code means for providing mirrored in-flight logs for said mirrored logical volumes, wherein said mirrored in-flight logs include a plurality of node partitions and each node partition corresponds to one of said plurality of active nodes, wherein said mirrored in-flight logs indicate whether or not a write operation is currently being performed by at least one of said plurality of active nodes; and program code means for automatically selecting a remaining node among said plurality of nodes to copy data from one of said mirrored logical volumes to another of said mirrored logical volumes, after an abnormal termination of one of said plurality of active nodes.

10. The computer program product according to claim 9, wherein said data copying from one of said mirrored logical volumes to another of said mirrored logical volumes is performed according to entries within a node partition of one of said mirrored in-flight logs corresponded to said abnormally terminated node.

11. The computer program product according to claim 10, wherein said computer program product further includes a program code means for clearing all entries within said node partition of one of said mirrored in-flight logs corresponded to said abnormally terminated node.

12. The computer program product according to claim 9, wherein said program code means for selecting is based on an arbitration process.

* * * * *